US008838029B2

(12) United States Patent  
Goldman et al.

(10) Patent No.: US 8,838,029 B2  
(45) Date of Patent: Sep. 16, 2014

(54) HEADSET SYSTEM WITH TWO USER INTERFACES

(75) Inventors: Tomasz Goldman, Hellerup (DK); Claus Tondering, Kgs. Lyngby (DK); Henning Toft Schwarz, Horsholm (DK)

(73) Assignee: GN Netcom A/S (DK)

( * ) Notice: Subject to any disclaimer, the term of this patent is extended or adjusted under 35 U.S.C. 154(b) by 510 days.

(21) Appl. No.: 13/144,817

(22) PCT Filed: Jan. 20, 2009

(86) PCT No.: PCT/DK2009/000013
§ 371 (c)(1),
(2), (4) Date: Jul. 15, 2011

(87) PCT Pub. No.: WO2010/083828
PCT Pub. Date: Jul. 29, 2010

(65) Prior Publication Data
US 2011/0275323 A1 Nov. 10, 2011

(51) Int. Cl.
*H04B 7/00* (2006.01)
*H04M 1/60* (2006.01)
*H04M 1/04* (2006.01)
*H04M 1/725* (2006.01)

(52) U.S. Cl.
CPC .......... *H04M 1/6066* (2013.01); *H04M 1/7253* (2013.01); *H04M 1/72502* (2013.01); *H04M 2250/02* (2013.01); *H04M 1/04* (2013.01); *H04M 1/6033* (2013.01)
USPC ...................... 455/41.2; 455/569.1; 455/575.2

(58) Field of Classification Search
CPC .................................................... H04M 1/6058
USPC .................................. 455/41.2, 569.1, 575.2
See application file for complete search history.

(56) References Cited

U.S. PATENT DOCUMENTS 6,978,163 B2 * 12/2005 Dyer et al. ................. 455/575.2  
7,558,529 B2 * 7/2009 Seshadri et al. ............. 455/41.2  
(Continued)

FOREIGN PATENT DOCUMENTS

CN 2779753 5/2006  
EP 1990982 11/2008  
(Continued)

OTHER PUBLICATIONS

GN Netcom: "GN 9350 Guide for basic set-up and use"; Dec. 31, 2005, XP2002552129 Retrieved from the Internet: url:http//www.paritel.fr/wp-content/uploads/Casque%20GN9350.pdf.

(Continued)

*Primary Examiner* — April G Gonzales  
(74) *Attorney, Agent, or Firm* — Altera Law Group, LLC (57) ABSTRACT

A headset system (1; 94) comprising a wireless headset (3; 32) and a headset base unit (2). The wireless headset (3; 32) comprises a headset transceiver (51) for wireless connectivity to the headset base unit (2), a speaker (43) and a microphone (44) and a headset user interface (52, 53). The headset base unit (2) comprises a base housing (4), a headset holder (5, 38), a first connection device (7), by means of which the headset base unit (2) is connectable to at least one telecommunication device (9, 10, 11), such as a PSTN phone (9), a PC phone (10) and a mobile phone (11). In addition, the headset base unit (2) comprises a first base transceiver (27) for wireless connectivity to the wireless headset (3; 32) and a base user interface (6). At least one audio characteristic, such as microphone audio volume, microphone audio equalization, speaker audio volume and speaker audio equalization, can be adjusted equally by the headset user interface (52, 53) and the base user interface (6).

23 Claims, 11 Drawing Sheets

(56) References Cited

U.S. PATENT DOCUMENTS

| | | | |
|---|---|---|---|
| 7,778,601 B2 * | 8/2010 | Seshadri et al. | 455/41.2 |
| 7,825,626 B2 * | 11/2010 | Kozisek | 320/114 |
| 2003/0013411 A1 * | 1/2003 | Uchiyama | 455/40 |
| 2004/0137969 A1 * | 7/2004 | Nassimi | 455/575.2 |
| 2006/0166705 A1 * | 7/2006 | Seshadri et al. | 455/569.1 |
| 2006/0166717 A1 * | 7/2006 | Seshadri et al. | 455/575.2 |
| 2006/0166718 A1 * | 7/2006 | Seshadri et al. | 455/575.2 |
| 2006/0252470 A1 * | 11/2006 | Seshadri et al. | 455/575.2 |
| 2009/0104940 A1 * | 4/2009 | Seshadri et al. | 455/563 |
| 2009/0273316 A1 * | 11/2009 | Lee | 320/138 |

FOREIGN PATENT DOCUMENTS

| | | |
|---|---|---|
| WO | WO 2005/064813 | 7/2005 |
| WO | WO 2007/019857 | 2/2007 |
| WO | WO 2007/143720 | 12/2007 |

OTHER PUBLICATIONS

Chinese Office Action issued on May 27, 2013 by the State Intellectual Property Office of People's Republic of China for corresponding Chinese Application No. 200980154916.X.

* cited by examiner

HEADSET SYSTEM WITH TWO USER INTERFACES

TECHNICAL FIELD

The invention relates to a headset system comprising a wireless headset and a headset base unit, wherein
the wireless headset comprises
   a transceiver or transmitter-receiver for wireless connectivity to the headset base unit,
   a speaker,
   a microphone and a headset user interface, and wherein
the headset base unit comprises
   a base housing,
   a headset holder,
   a first connection device, by means of which the headset base unit is connectable to at least one telecommunication device, such as a PSTN phone, a PC phone and a mobile phone,
   a first base transceiver or transmitter-receiver for wireless connectivity to the wireless headset, and
   a base user interface.

BACKGROUND

A headset system according to the disclosure is mainly used in offices, receptions and call centres.

The headset base unit, which is connected to a telecommunication device, such as a PSTN (Public Switched Telephone Network) phone, is normally placed on the desk within reach of the user, so that he with his hand can take the headset from the headset base unit's headset holder and arrange it on his head.

Such headset systems provide hands free operation, as the user while speaking through the headset can use his hands for other purposes, such using a computer, handling papers etc.

Wireless headsets are increasingly used as no wire will be in the way and because the user may be able to leave his desk while talking through the headset.

The Bluetooth standard and communications protocol is primarily designed for low power consumption, with a short range (power-class-dependent: 1 meter, 10 meters, 100 meters) based on low-cost transceiver microchips in each device.

Bluetooth enables these devices to communicate with each other when they are in range. The devices use a radio communications system, so they do not have to be in line of sight of each other, and can even be in other rooms, as long as the received transmission is powerful enough.

In addition, headsets following other wireless standards such as DECT are becoming more and more popular.

Because of the limited size of a headset and because it is desirable to operate it while located out of sight on the user's head or ear, interaction with the user becomes a challenge. The headset user interface normally consists of a few buttons and a light emitting diode. In some cases, a small display is provided on the side of the headset.

The base user interface can have one or more of the following advantages over the headset interface:
   the base user interface can be designed larger than the headset user interface and thereby more sturdy and easy to operate,
   the user can look at the base interface while operating it,
   the risk of pushing the headset out of correct position when operating the headset user interface is avoided, when the base user interface can be used.

GN 9350 is an office headset system comprising a headset base unit to be placed on a desk and a wireless headset, which can be placed in a headset holder of the headset base unit when not in use. The headset is recharged when placed in the holder. The headset base unit can be simultaneously connected to a desk phone, which can be a PSTN phone or an IP Phone, and a USB socket on a PC. The upper surface of the headset base unit is provided with a "telephone mode" button and a "USB mode" button. When the user wants to make or receive a telephone call via the desk phone, he presses the "telephone mode" button. If the user wants to make or receive a call via a soft phone installed on the PC, he presses the "USB mode" button. In addition, the headset base unit comprises a cover, underneath of which a display and buttons are arranged. Here, the user can adjust parameters such as microphone level, hook switch selection (type of electronic switch or hook lifter), range/power selection (the headset base unit's transmitting power), tone settings (equalisation), wideband/narrowband selection and protection level (protection against sudden sound spikes). The headset unit comprises a "talk button" for ending and receive calls, and a "volume control button" for adjusting the speaker volume and muting the microphone.

DETAILED DESCRIPTION

An object of the invention is to provide a headset system according to the preamble with increased user-friendliness. The headset system according to the invention is characterised in that at least one audio characteristic, such as microphone audio volume, microphone audio equalisation, speaker audio volume and speaker audio equalisation, can be adjusted equally by the headset user interface and the base user interface.

Thus, the user may control the audio characteristic in question by means of the headset user interface, when the headset base unit is out of reach and adjust the same audio characteristic by means of the base user interface, when the headset base unit is within reach. This is not the case with prior art, where audio characteristics are controlled by either the base user interface or the headset user interface.

The headset base unit may comprise a display unit with a display adapted for displaying status about audio characteristics.

According to a preferred embodiment, the display is a touch-screen display, which acts as base user interface.

According to an embodiment, the adjustment of the audio characteristic takes place in the headset. In this case, control signals from are sent from the headset base unit to the headset, when the base user interface is used. If the headset base unit comprises a display able to display status of audio characteristic, status signals indicating such are sent from the headset to the base.

The adjustment of the audio characteristic can also take place in the headset base unit. If the headset base unit comprises a display able to display status of audio characteristic, control signals for adjusting the audio characteristic are sent from the headset to the base.

It is an option, that adjustment of some audio characteristics takes place in the headset, while adjustment of other audio characteristics takes place in the headset base unit. In all cases, the user will normally not notice the difference, as he can use the headset interface and the base interface equally.

According to an embodiment, the headset user interface comprises a headset touch button, wherein at least one audio characteristic can be adjusted by touching the headset touch button. The headset touch button may be adapted, so that the audio characteristic is adjusted by sliding the finger along the headset touch button. For example, the headset speaker volume may be adjusted up by sliding the finger in one direction and down by sliding the finger in the opposite direction.

The headset touch button may consist of an array of discrete segments, and the audio characteristic is adjusted stepwise by sliding the finger along the headset touch button.

Alternatively, the audio characteristic is adjusted in dependency on the time the user is touching the headset touch button.

In this case, the headset touch button may comprises a first segment and a second segment, wherein the audio characteristic is adjusted in a first direction by touching the first segment and in a second direction by touching the second segment.

According to an embodiment, the headset base unit is adapted to instruct a connected telecommunication device to initiate an outgoing call by means of the base user interface. For example, the headset base unit may send a telephone number to a connected mobile phone and a control signal that instructs the mobile phone to dial this number.

The headset base unit may be adapted to store a call list or phone book and show this call list or phone book on the display.

According to an embodiment, the touch-screen display is adapted to display a keypad for dialing a telephone number.

According to a preferred embodiment, the headset speaker provides audible sounds, when the user operates the headset user interface or the base user interface.

The headset base unit may also comprise a speaker providing audible sounds, when the user operates the base user interface or the headset user interface.

The audible sounds may comprise voice tags pronouncing words identifying the operation carried out. As an example, the headset speaker or the base speaker may pronounce "volume up" or "volume down", which is particularly expedient, when the headset user interface is operated.

Preferably, the headset base unit is simultaneously connectable to more than one telecommunication device. In this case, the headset base unit preferably comprises control means, by means of which an audio channel can be opened between the headset and a selected one of the telecommunication devices.

The display is preferably adapted to display device icons representing connected telecommunication devices. In this case, it is expedient, if a telecommunication device can be selected by touching the device icon representing the telecommunication device.

Preferably, the icons change appearance in dependence on the call status, such as incoming call, on call and on hold, of the represented telecommunication device.

Preferably, the headset holder comprises charging terminals for charging a rechargeable battery of the headset, when it as arranged in the holder.

Preferably, the display is able to show battery status of the headset.

The headset system according to the invention may also be provided with a remote control, whereby the user may be able to adjust an audio characteristic equally from three different places: the headset, the base unit and the remote control.

BRIEF DESCRIPTION OF THE DRAWINGS

The invention is explained in detail below with reference to the drawing illustrating a preferred embodiment of the invention and in which.

MODES FOR CARRYING OUT THE EMBODIMENTS

Figure 1:
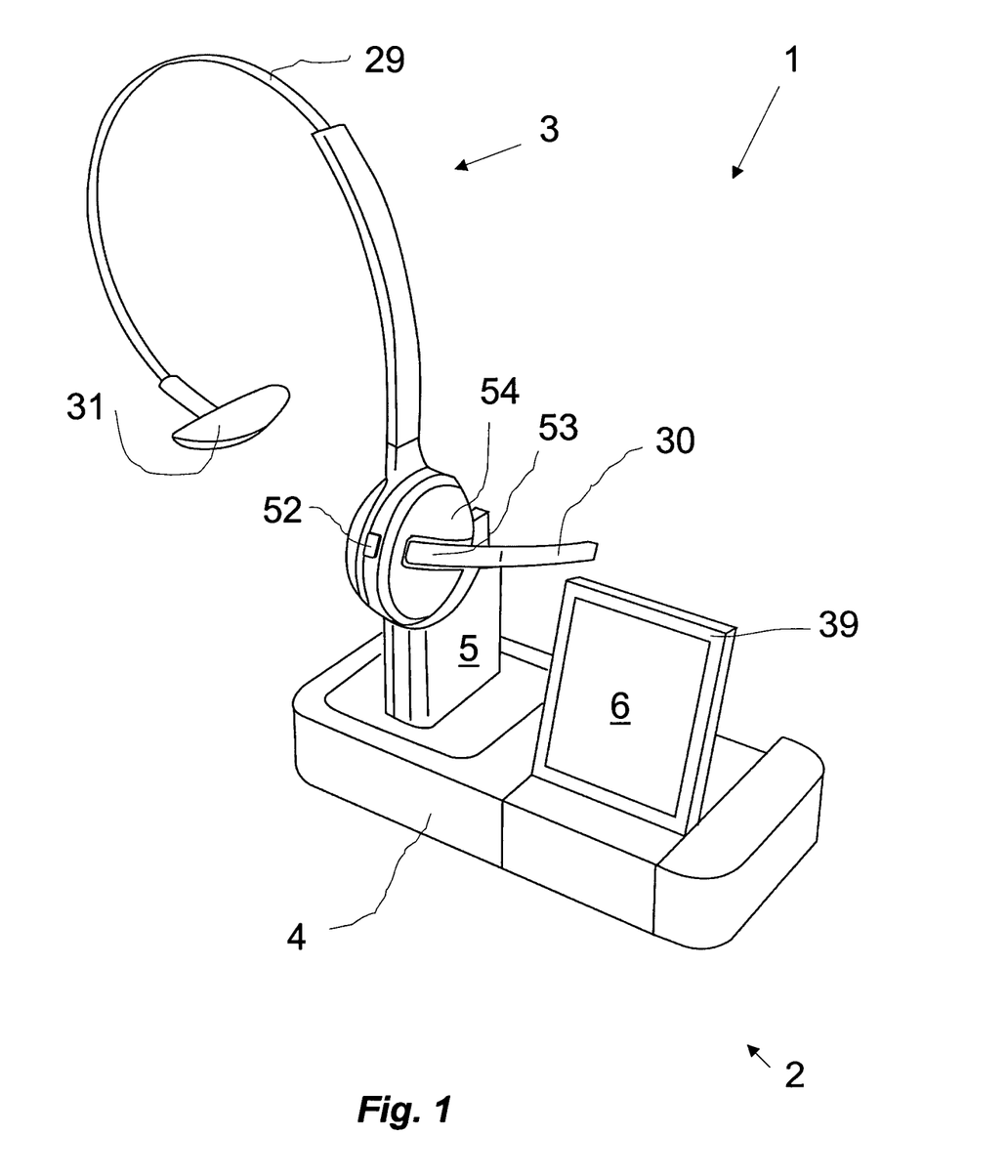
FIG. 1 is a perspective view of a preferred embodiment of a headset system according to the invention comprising a headset base unit and a headset arranged on a headset holder of the headset base unit, FIG. 2 the headset base unit of the system of FIG. 1, FIG. 3 the headset base unit, where a headset holder unit is released from the remainder of the headset base unit, FIG. 4 the headset system with the headset holder unit is in a second position, FIG. 5 a second embodiment of a headset system according to the invention, FIG. 6 the headset of the first embodiment, FIG. 7 a diagram showing the headset system according to the invention connected to three different telecommunication devices, FIG. 8 different views of the display during use of the headset system according to the invention, FIG. 9 different views of the display during adjustment of call options, and FIG. 10 different views of the display during setup of the headset system according to the invention.

FIG. 1 discloses a headset system 1 according to a preferred embodiment. The headset system comprises a headset base unit 2 and a wireless headset 3. The headset base unit 2 comprises a housing 4, a headset holder 5 and a display device 39 with a touch-screen display 6. The display device is a part of or physically connected to the housing 4. When not in use, the headset 3 is arranged on the headset holder 5, as shown in FIG. 1. The headset 3 comprises an earphone housing 54, a microphone arm 30 extending from the earphone housing 54 and a headband 29, which extends from the earphone housing 54 and comprises a T-shaped endpiece 31 at the opposite free end.

Figure 2:
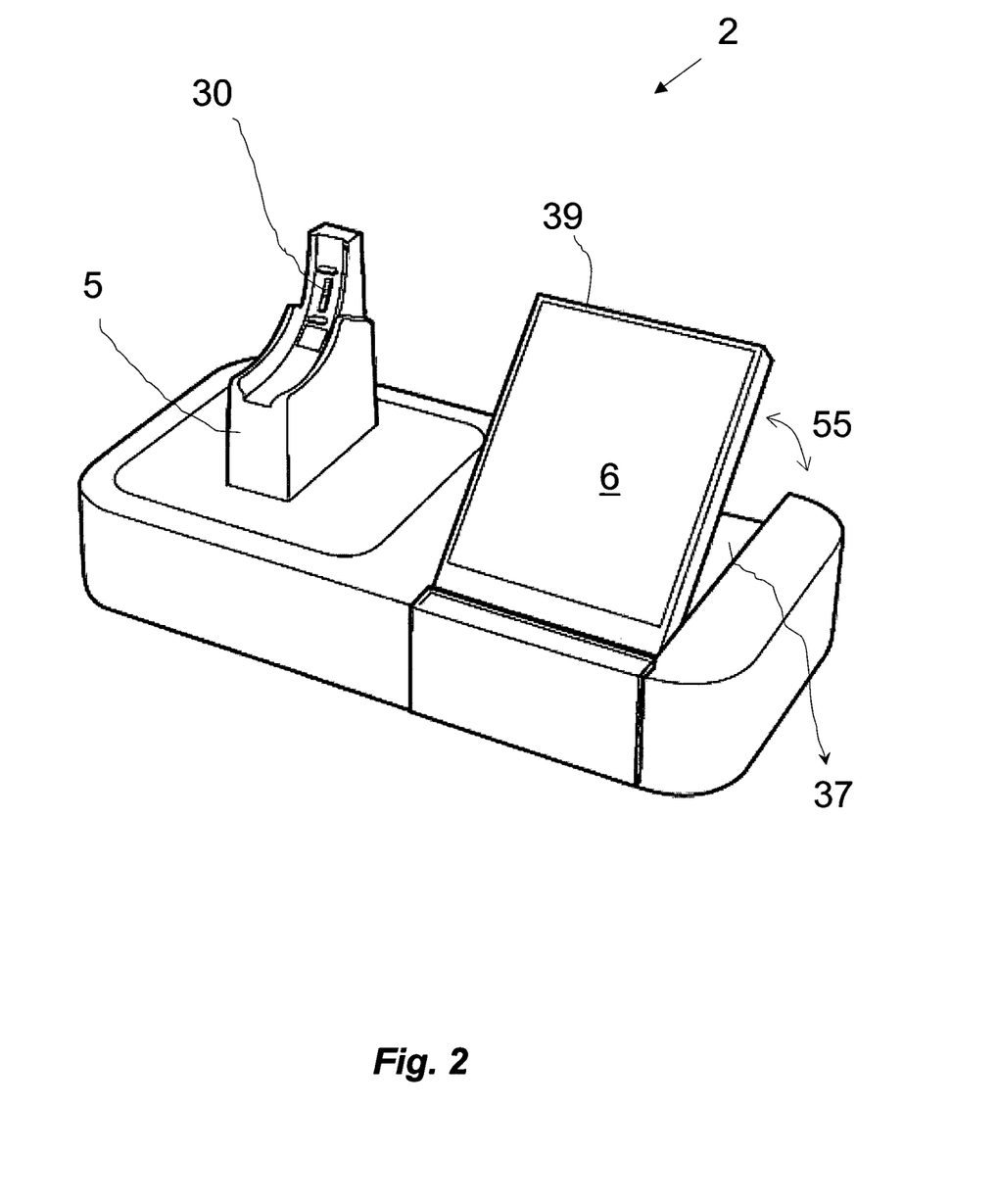

In FIG. 2, the headset 3 is removed from the headset base unit 2. The upper side of the headset holder 5 comprises charging terminals 30 for recharging the battery of the headset 3, when the latter is received by the headset holder 5. The display device 39 is step-less adjustable from 0° to 90° along the arrow 55. This is made possible through a friction hinge. Thus, the user can adjust the display device 39 to an appropriate viewing angle. In the 0° position (not shown), the display device 29 is received in a recess 37 in the base housing 4, so that it flushes with the upper side of the base housing 4. In FIG. 2, the display device 39 is positioned at an angle between 0° and 90°.

Figure 3:
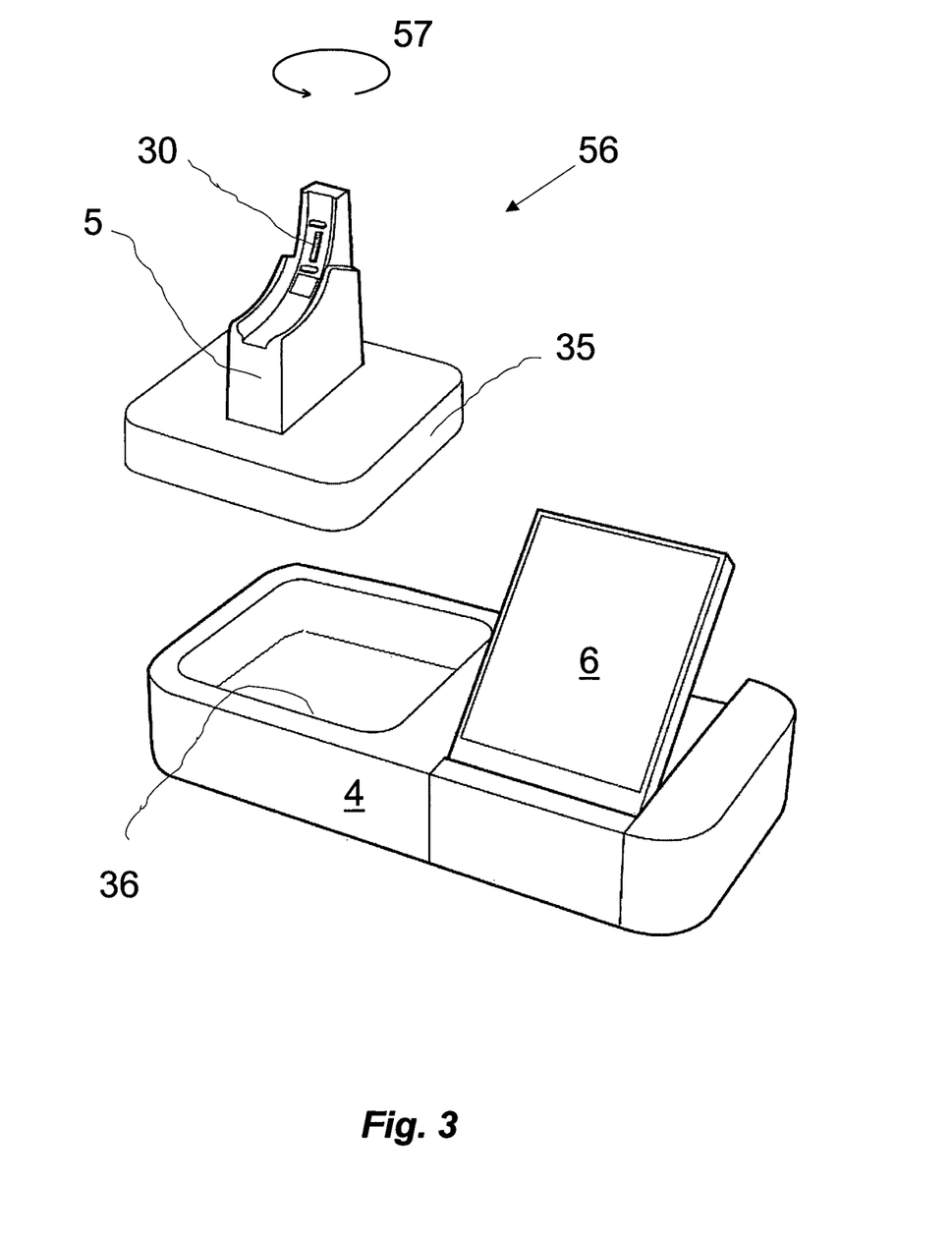
Figure 4:
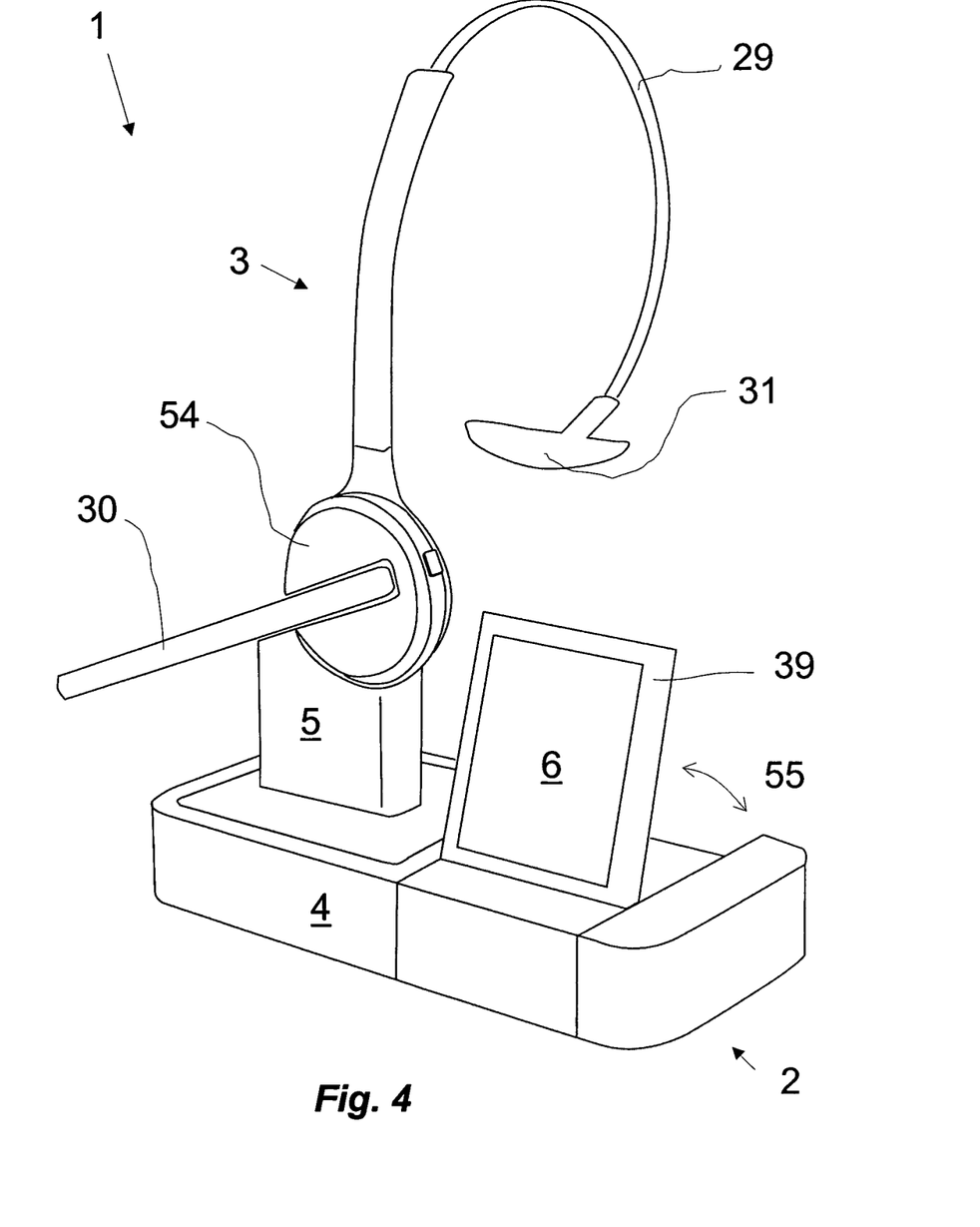

In FIG. 3, it is showed that a holder unit 56 comprising the headset holder 5 and a bottom part 35 can be lifted out of a receiving hole 36 in the base housing 4. By turning the holder unit 56 90° along the arrow 57 about a vertical axis and return it to the receiving hole 36, the headset holder 5 can be adjusted from "right ear position" shown in FIG. 1 to a "left ear position" shown in FIG. 4. In the "right ear position" (FIG. 1), the user can easily grab the headset 3 with his right hand and put it on his head so that the earphone 54 is placed on the right ear. In the "left ear position" (FIG. 4), the user can easily grab the headset 3 with his left hand and arrange it on his head so that the earphone 54 is placed on his left ear. Electrical contact between the headset holder unit 56 and the remainder of the headset base unit 2 can be maintained during adjustment by means of a not shown wire. Alternatively contact terminals could be provided on bottom part 35 of the holder unit 56 and in the receiving hole 36 so that electrical contact is established in the selected adjustment position.

In an alternative embodiment, the headset holder 5 could be rotatably mounted, so that it could be rotated about a vertical axis without being removed from the headset base unit 2.

Figure 5:
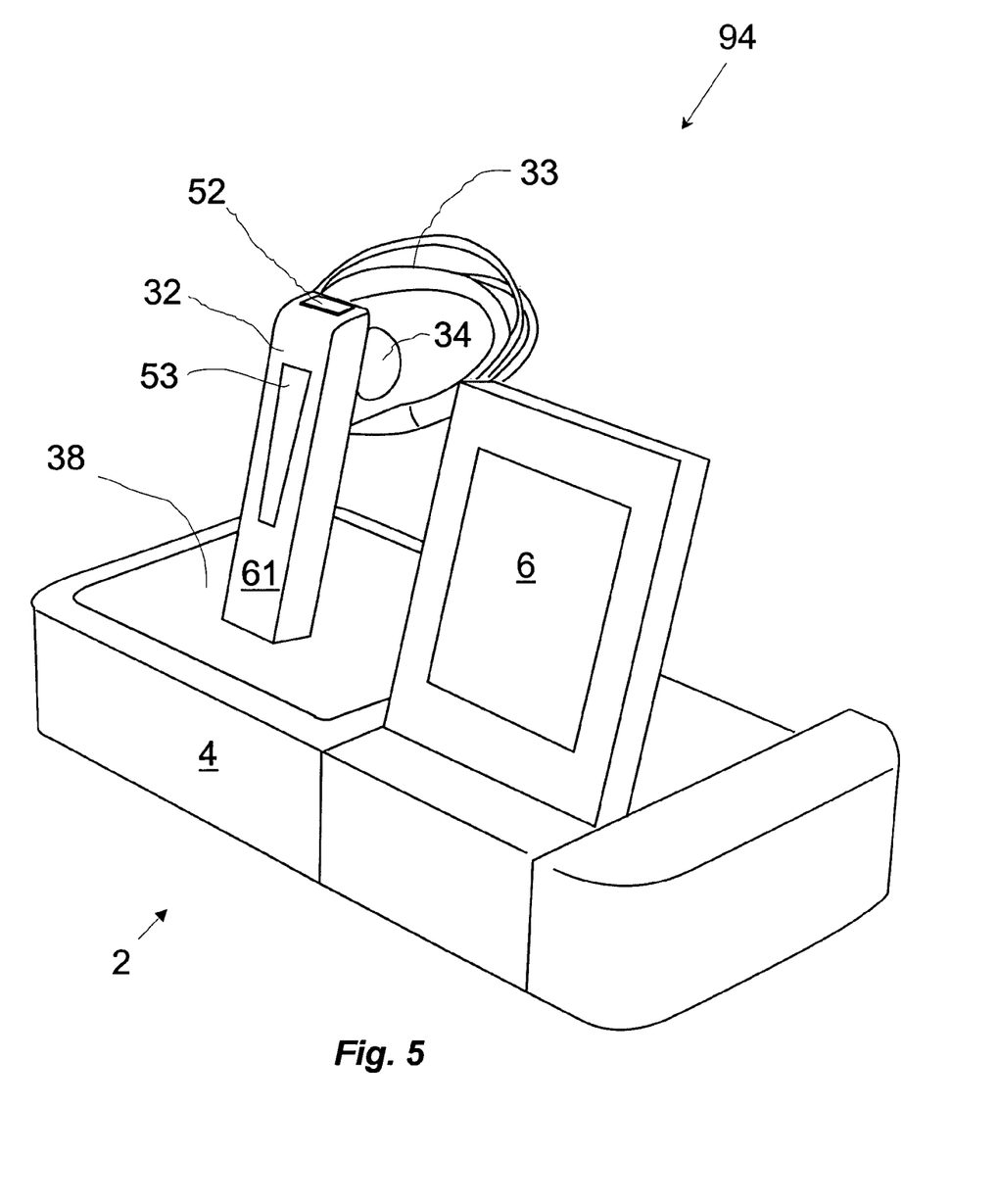

The holder unit 56 can also be replaced by another holder unit. This is advantageous as the headset base unit 2 then can be adapted for use with another headset. In FIG. 5 is shown a second embodiment of the headset system 94 according to the invention. This embodiment differs from the first embodiment by the holder unit 38 being adapted for a different type of wireless headset 32. Thus, the holder unit 38 according to the second embodiment does not comprise an upwardly extending headset holder but simply a receiving hole in the top surface. The headset 32 according to the second embodiment comprises a headset housing 61, an earbud 34 to be inserted into the ear and an ear hook 33 to be arranged around the outer ear of the user. The user interface of the headset 32 comprises a multi-function button 52 and an elongate volume touch button 53. The user can inter alia receive and end calls by pressing the multi-function button 52 and adjust the headset volume by sliding a finger along the volume button 53. Thus, the user turns the volume up by sliding the finger in one direction and turns the volume down by sliding the finger in the opposite direction.

Figure 6:
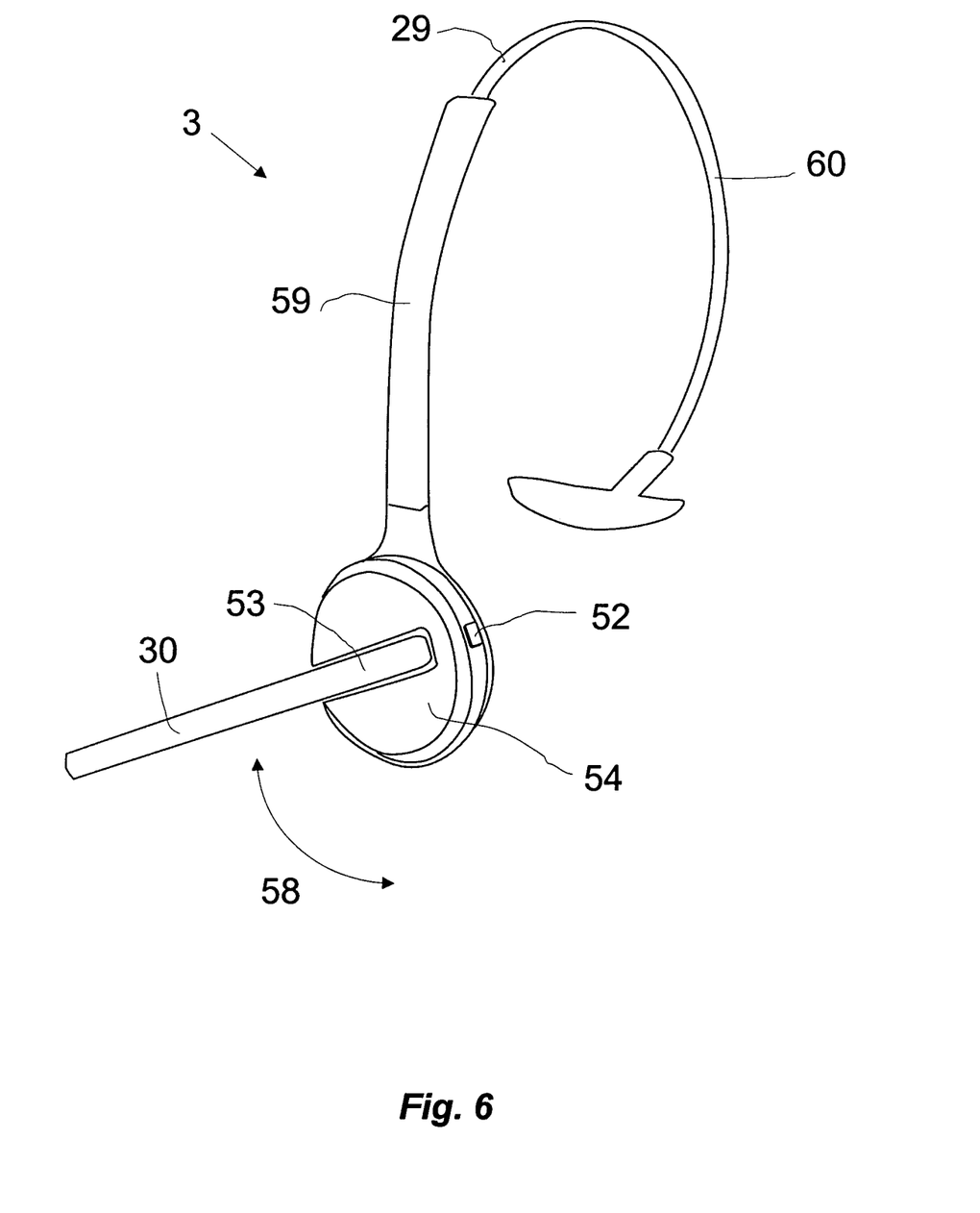

FIG. 6 discloses the headset 3 according to the first embodiment. As indicated with the arrow 58, the microphone arm 30 can be rotated about an axis essentially perpendicular to the large outer surface of the earphone 54 in order to point it in the direction of the user's mouth and to adjust the headset 3 from left ear use to right ear use and vice versa. In FIG. 6, the headset 3 is adjusted to left ear use. The headband 29 comprises a first headband part 59 and a second headband part 60. The second headband 60 part is telescopically received in the first headband part 59, so that the length of the headband 29 can be adjusted to the size of the user's head. On the outer side of the microphone arm and within the outer boundary of the earphone 54, the headset 3 comprises an elongate volume touch button 53. The user can adjust the speaker volume by sliding the finger in the lengthwise direction of the touch button 53 as explained in connection with the second embodiment. The circumferential surface of the earphone 54 comprises a multi-function button 52 for inter alia receiving and ending calls.

Figure 7:
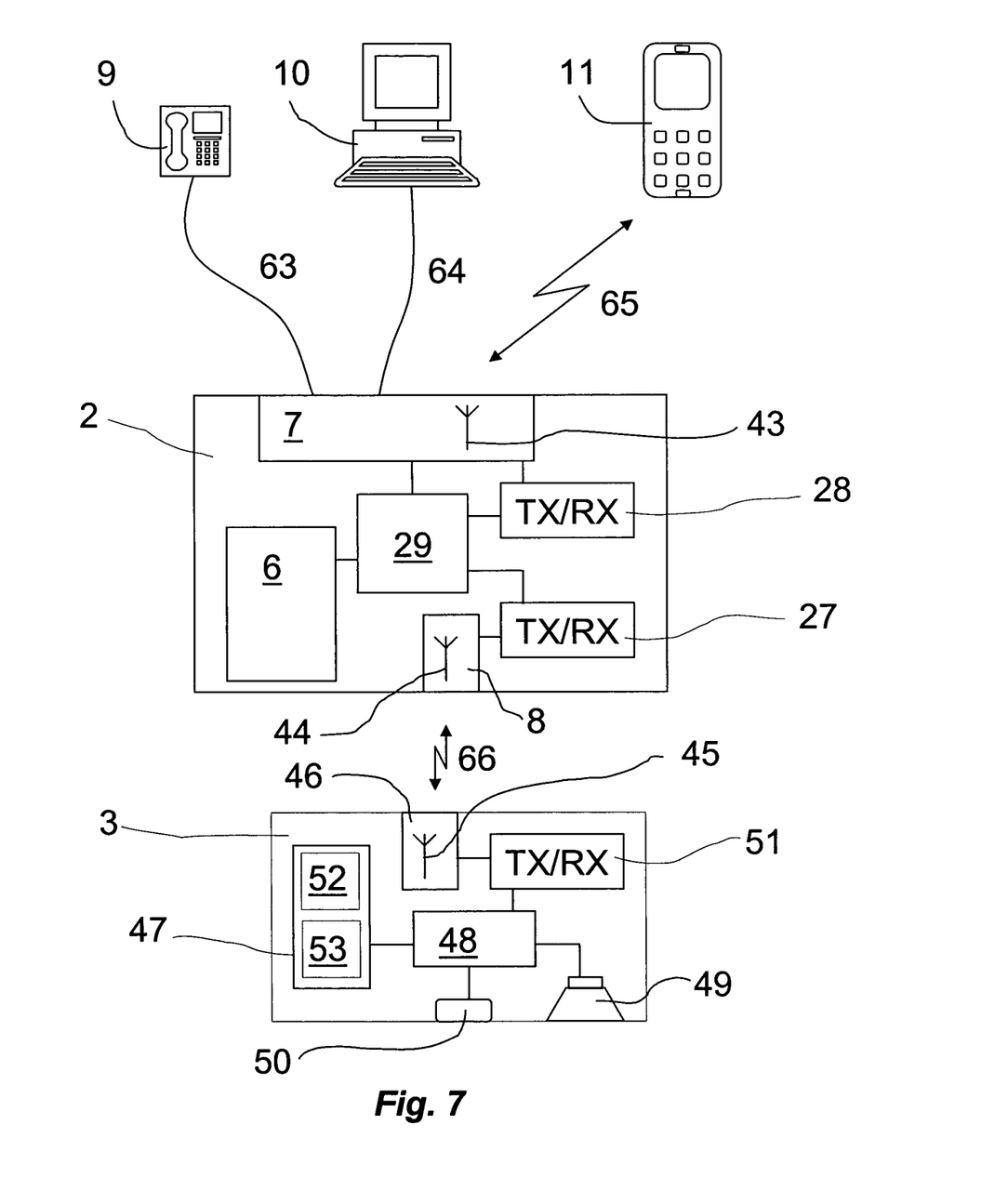

FIG. 7 is a diagram showing how a headset system according to the invention can be connected to a number of telecommunication terminals. The headset base unit 2 comprises a base processor 29, a first connection device 7, a second connection device 8, a first transceiver 27, a second transceiver 28 and a touch screen display 6. The headset base unit 2 is by means of the first connection device 7 connected to a desk phone (PSTN) 9, a PC 10 and a mobile phone 11. The desk phone 9 and the PC 10 are connected by wires 63, 64 to the connection device 7. The wire between PC 10 and the base unit 2 is a USB cable 64. The first connection device 7 also comprises an antenna 43 by means of which a wireless connection 65 to the mobile phone 11 is established. This wireless connection is established by means of the second transceiver 28 and a corresponding transceiver (not shown) in the mobile phone. The wireless connection follows the Bluetooth standard, which means that the second transceiver 28 is a Bluetooth transceiver. However, other standards such as DECT could be utilized. The headset base unit comprises a speaker (not shown in FIG. 7) for generating an audible feedback to the user when operating the touch display. The speaker will also be used to signal an incoming soft phone call. The second connection device 8 also comprises an antenna 44. A wireless connection 66 between the headset base unit 2 and the headset 3 is established by means of the first transceiver 27 and the antenna 44. The user interface of the headset base 2 comprises the touch screen display 6, which will be described later in detail.

The headset 3 comprises a headset processor 48, a headset connection device 46 with an antenna 45, a headset transceiver 51, a speaker 49 a microphone 50 and a user interface 47.

The user interface 47 comprises the multi-function 52 button and the touch volume button 53. The wireless connection 66 between the headset 3 and the headset base unit 2 follows the DECT standard. However, other standards, such as Bluetooth could be used. If Bluetooth is used, the headset 3 could be simultaneously connected to another Bluetooth device, such as the mobile phone 11. The headset shown in FIG. 3 is especially suitable for such a solution, as it is compact and easy to carry in a pocket or bag.

FIG. 8 shows different views of the touch screen display during use of the headset system according to the invention. A touch screen display normally comprises a flat screen display, which is based on LCD, TFT, OLED or other technology and is covered with a transparent touch panel. The touch panel is normally a so-called capacitive or resistive panel. However, other touch panel technologies can be applied. The touch screen display can show different areas, "widgets" or icons, the user can touch in order to control the headset system. In the following, the display 6 is shown for typical situations during use of a headset system according to the invention connected to a desk phone, a PC and a mobile phone.

Figure 8A:
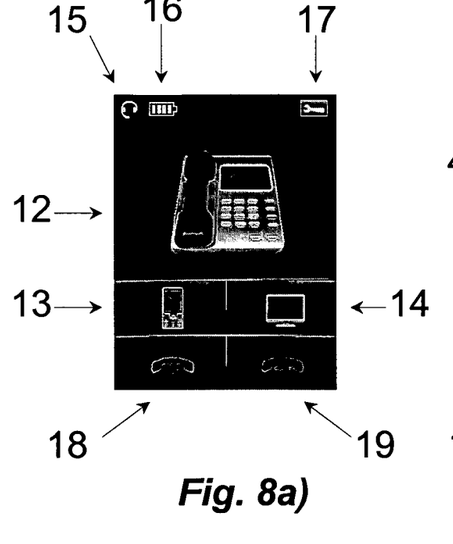

FIG. 8a) "Normal Idle Situation"

In the idle mode situation shown in FIG. 8a), the headset is in idle mode, i.e. there are no active calls. The upper area of the screen is called the "status bar" and comprises a headset icon 15, a battery level icon 16 and a setup icon 17 represented by a small wrench. The headset icon 15 indicates that the headset and the headset base unit are connected. The battery level icon 17 indicates the battery level of the rechargeable battery of the headset. The large icon 12 showing a desk phone with the handset in the cradle is named the target phone icon 12. An outgoing call made from the headset or the headset base unit is made from the telecommunication device selected as "target phone". Below the large "target phone" icon 12 there is a "button stack" with two smaller icons: a mobile phone icon 13 and a PC icon 14: These icons indicate that these telecommunication devices are also connected to the headset base unit. If the user touches the mobile phone icon 13, the target phone icon 12 changes from a desk phone icon to a mobile phone icon, while a smaller desk phone icon will appear in the button stack. In the lower part of the screen, there are a first handset icon 18 and a second handset icon 19, which are used for receiving and ending calls. It does not appear form the drawing, but the first handset icon 18 is green and the second handset 19 icon is red.

Figure 8B:
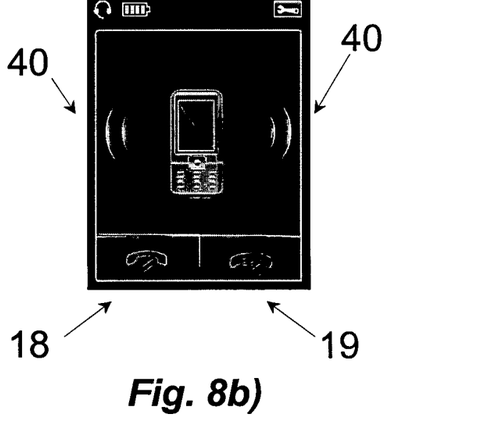

FIG. 8b) "Ringing"

In the ringing situation shown in FIG. 8b), there is an incoming call on the mobile phone, which is indicated by an incoming call icon 40 with animated symbols representing sound waves. Thus, the user's attention is drawn to the display. If the user wants to receive the call, he touches the first handset icon 18, and if he wants to reject the call, he touches the second handset icon 19.

Figures 8C, 8D:
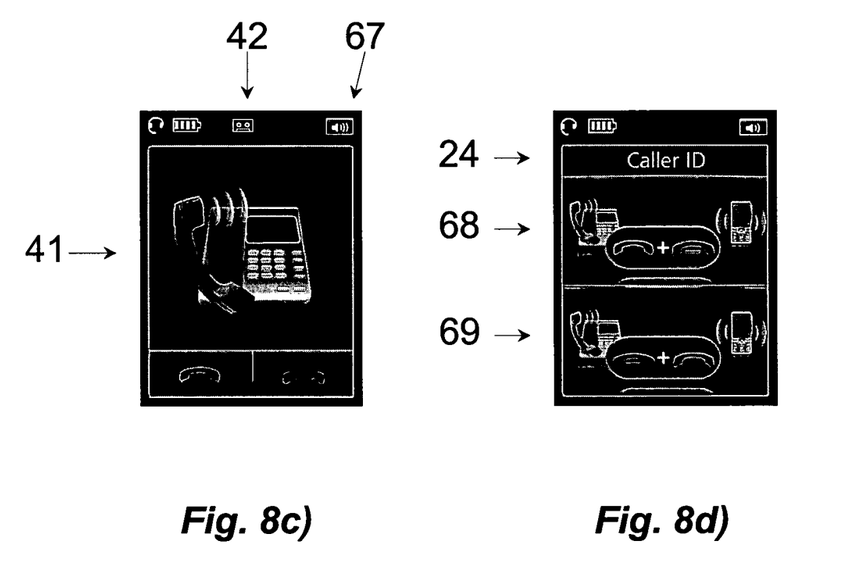

FIG. 8c) "on Call"

FIG. 8c) disclose the screen when there is an active call on the desk phone. The active call is indicted by an on call icon 41 showing a sound wave symbol at the speaker of the lifted handset. During an active call, the setup icon 17 has changed to a call option icon 67, represented by a small speaker with a sound wave symbol. By touching this icon, the user gets access to various call adjustments shown in FIG. 9. A "recording" icon 42 shown in the status bar indicates that a call via the PC soft phone is recorded on the PC. However, there could also be a recording function built into the headset base unit 2, so that calls through any of the connected telecommunication devices could be recorded.

FIG. 8d) "Call Collision"

FIG. 8d) discloses what is called a "call collision scenario". There is an active call on the desk phone and an incoming call on the mobile phone. The caller ID 24 of the caller on the mobile phone is shown on the screen just below the status bar. The caller ID is normally a phone number or the mane of the calling party. The user now has two options represented by a first call collision icon 68 and a second call collision icon 69. If he touches the first icon 68, he rejects the incoming call on the mobile phone and continues the call on the desk phone. If he touches the second icon 69, he ends the call on the desk phone and receives the incoming call on the mobile phone.

Figure 8E:
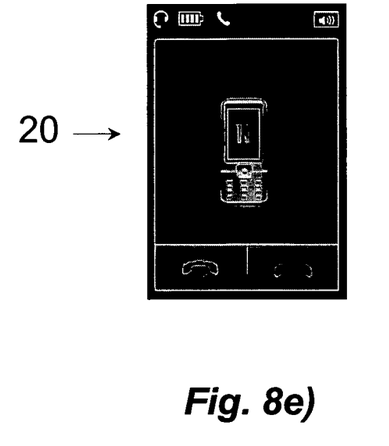

FIG. 8e) "on Call/Hold"

In FIG. 8e) a call on the mobile phone is put on hold, which is indicated by the on hold icon 20. By simply touching the on hold icon 20, the user can make the call active again. By touching the icon representing the active call (see FIG. 8c)), the user can put the call on hold again.

Figure 8F:
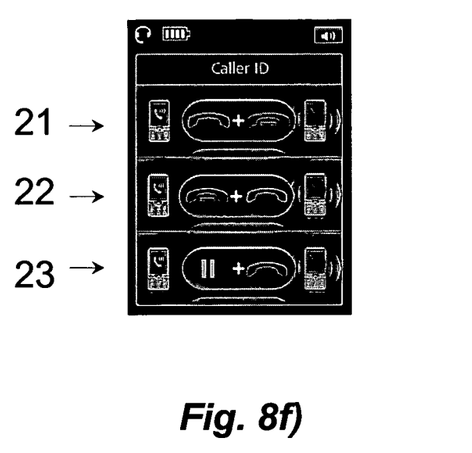

FIG. 8f) "On Call/Incoming Call on Same Line"

In FIG. 8f), the user has an active call on the mobile phone while there is an incoming call on the same phone. He now has three options represented by a first incoming call icon 21, a second incoming call icon 22 and a third incoming call icon 23. If he selects the first icon 21, he continues the active call and rejects the incoming call. If he selects the second icon 22, he ends the active call and receives the incoming call. If he selects the third icon 23, he puts the active call on hold and receives the incoming call.

Figure 8G:
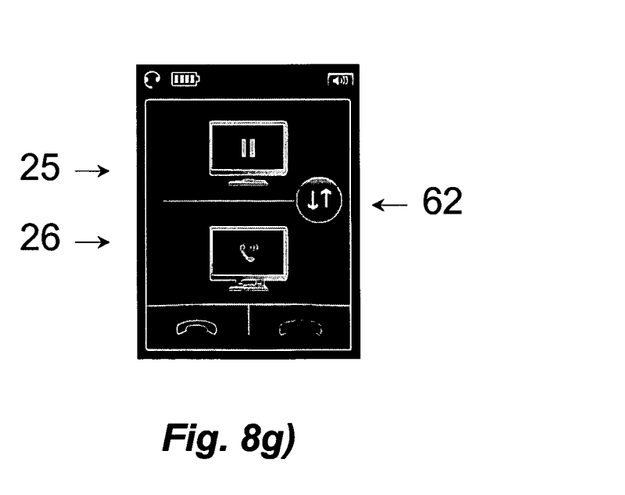

FIG. 8g) "N-Way Call"

In FIG. 8 g), the user has a call on hold on the PC soft phone, represented by the on hold icon 25, and an active call on the PC soft phone, represented by the on call icon 26. Between these two icons 25, 26 there is a swap icon 62. The user can swap between the two calls, i.e. put the active call on hold and vice versa, by touching the swap icon 62.

Figures 9A, 9B:
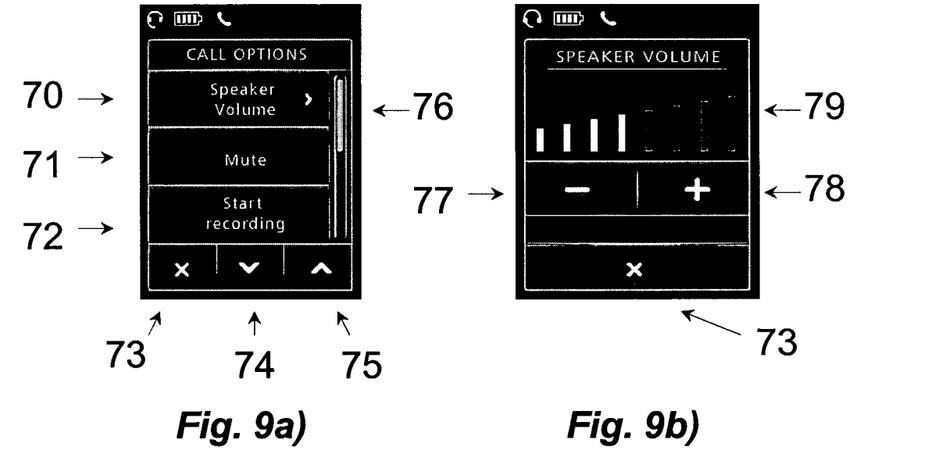

FIG. 9 shows how different call options can be adjusted by means of the touch screen. If the user touches the call options icon 67 (see FIG. 8c)), the call options screen shown in FIG. 9a) appears. The call options screen comprises a call options menu with a speaker volume icon 70, a mute icon 71 and a start recording icon 72. The screen also comprises a scroll down icon 74, a scroll up icon 75 and an exit icon 73 in the lower end of the screen and a scroll bar 76 in the right side of the screen. Further menu icons, such as "tone setting", becomes visible by upwards and downwards scrolling by means of the scroll down icon 74 and the scroll up icon 75. The scroll bar 76 indicates which part of the menu that is visible. Alternatively or additionally, the user may scroll by sliding the finger in the direction of the scroll bar 76. If the user touches the exit button 73, the call options menu is left. A selection of the speaker volume icon 70 will be explained below in connection with FIG. 9b). If the user touches the mute icon 71, the headset microphone is muted. If the user touches the start recording icon 72 all communication is sent by means of the USB cable 64 to the PC 10 and recorded by means of appropriate software. The software can be set to stop recording at the end of a call, or just pause recording between calls.

If the user selects the speaker volume icon 70, the screen shown in FIG. 9b) appears. The screen comprises a speaker meter icon 79 indicating the speaker level, a first adjustment icon 77 with a minus character and a second adjustment icon 78 with a plus character. The user can turn the speaker volume down by touching the first adjustment icon 77 and up by touching the second adjustment icon 78. The speaker meter icon 79 has eight levels and in FIG. 9b), speaker level four is selected. The speed or the number of steps, speaker volume is adjusted by touching adjustment icons 77, 78 may depend on how long the user touches them. In an alternative embodiment, the adjustment make take place by sliding the finger across the touch screen display 6, so that the speaker volume is adjusted upwards, when by sliding the finger in a first direction and downwards by sliding the finger in the opposite direction. The headset base unit may be adapted to remember the last volume setting for each connected telecommunication device and report the volume setting by sending control signals to the headset when a telecommunication device is selected. Thus, the volume is separately set for the desk phone, the soft phone and mobile phone. The user can leave the speaker volume screen by touching the exit icon 73.

Figure 9C:
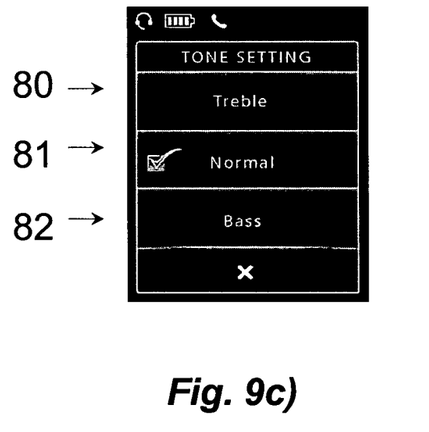
Figure 10A:
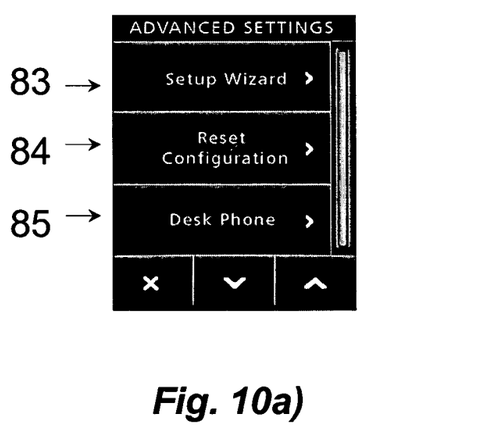
Figure 10B:
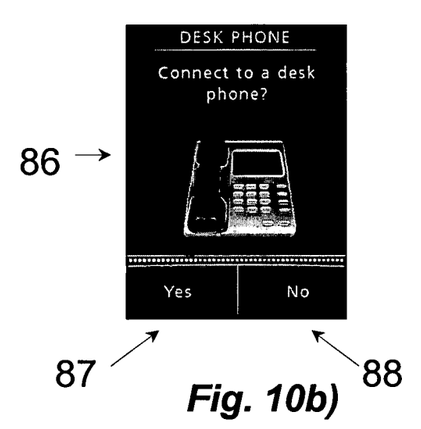
Figure 10C:
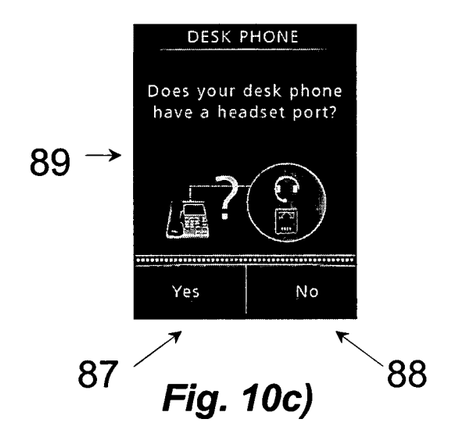
Figure 10D:
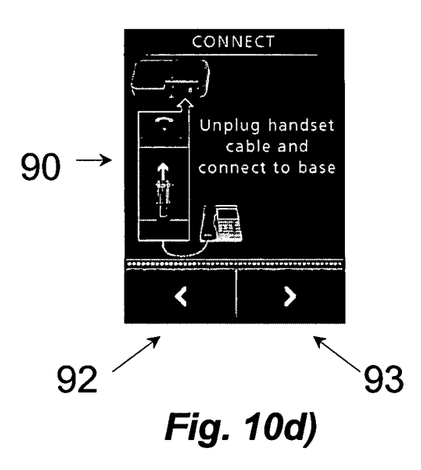
Figure 10E:
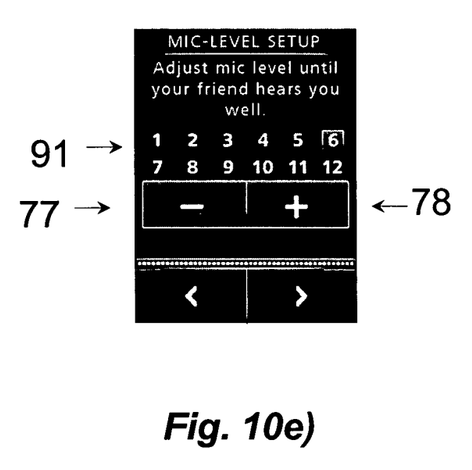

In FIG. 9c), the user has selected "tone setting" (equalisation) from the call options menu. Here the user can select the sound from the headset speaker to be one of three different types represented by a treble icon 80, a normal icon 81 and a bass icon 82. If he selects the treble icon 80, the sound in the treble area will be accentuated, and if he selects the bass icon 82, the sound in the bass area will be accentuated. The normal icon 81 selects a neutral sound.

Preferably, the speaker volume, microphone muting and speaker tone setting takes place in the headset, which means that control signals for adjusting the settings are sent from the headset base unit to the headset. The headset sends status signals to the headset base unit about the settings, so that the display shows the correct levels.

Some of these adjustments can also be carried by means of the headset user interface. It is especially advantageous, if the headset speaker volume can be adjusted by the headset user interface. Thus, the headset volume button 53 shown in FIGS. 5 and 6 is used for adjusting the headset speaker volume, while status signals simultaneously is sent to the headset base unit in order to update the display. In this case, it is optional for the user whether he wants to make audio adjustments by means of the headset user interface or by means of the base user interface. If the user is away from the headset, he will use the headset user interface. If he sits at his desk, he may prefer to use the base user interface.

Alternatively, the adjustments take place in the headset base, in which case control signals are sent from the headset to the headset base in order to adjust the audio settings.

In all cases, status or signals are exchanged between the headset and the base, so that the status information shown on the display of the headset base unit is synchronized with the actual sound setting.

FIG. 10 discloses different views of the display during setup of the headset system according to the invention. If the user touches the setup icon 17 (see FIG. 8a)), the screen shown in FIG. 10a) appears. This screen comprises an advanced settings menu with a setup wizard icon 83, a reset configuration icon 84 and a desk phone icon 85. If the user wants to use the setup wizard, he touches the setup wizard icon 83 and the display 6 guides him through a setup. During the setup, a "connect to a desk phone icon" 86 appears as shown in FIG. 10b). If the user wants to connect the headset base unit to a desk phone, he touches the "yes icon" 87, otherwise the "no icon" 88. If he touches the "yes icon" 87, the screen shown in FIG. 10c) appears. Here, the user is asked with the question icon 89: "Does your desk phone have a headset port?". If the user touches the "no icon" 88, the screen shown in FIG. 10*d*) appears. Here the user is instructed by the instruction icon 90 to unplug the handset cable and connect it to the headset base unit. Display graphics illustrate how to do this. The user can access further setup steps by touching the "next icon" 93 or return to the previous step by touching the "back icon" 92. Further steps guiding the user to a complete cable connection are not shown here. In FIG. 10*e*) the user is guided through adjustment of the microphone level by means of a microphone level icon 91, which shows twelve levels. Before this screen, the user is instructed to call a friend. The user touches the "adjustment icons" 77, 78 until a desired microphone level is obtained. Off course, FIG. 10 only show a few setup screens, as several other not shown screens guides the user to setup the headset base unit with other telecommunication devices, such as a mobile phone and a PC soft phone.

The invention also covers embodiments, where more than one telecommunication device of the same type, for example two or three desk phones, can be connected to the same headset base unit. In such a situation, it would be possible to name the devices such as "desk phone 1", "desk phone 2" or "local desk phone", "external desk phone".

The display 6, whether it is a touch screen display or not, may also be used for displaying SMS messages, news feeds, e-mail's etc. For example, SMS messages received by a connected mobile phone may be forwarded to the headset base unit and shown on the display. Another example is e-mails received by a connected PC, which are forwarded to the headset base unit and shown on the display.

A wireless headset system is described in detail here. However, the invention also relates to wired solutions, where the headset and the headset base unit are interconnected by a wire.

| Reference signs | |
|---|---|
| 1 | headset system |
| 2 | base |
| 3 | headset |
| 4 | base housing |
| 5 | headset holder |
| 6 | display |
| 7 | first connection device |
| 8 | second connection device |
| 9 | desk phone |
| 10 | PC |
| 11 | mobile phone |
| 12 | target phone icon |
| 13 | mobile phone icon |
| 14 | PC icon |
| 15 | headset icon |
| 16 | battery level icon |
| 17 | setup icon |
| 18 | first handset icon |
| 19 | second handset icon |
| 20 | on hold icon |
| 21-23 | icons for incoming call on same line |
| 24 | caller ID icon |
| 25 | on hold icon |
| 26 | on call icon |
| 27 | first base transceiver |
| 28 | second base transceiver |
| 29 | base processor |
| 30 | charging terminals |
| 31 | endpiece of headband |
| 32 | headset (second embodiment) |
| 33 | ear hook |
| 34 | earbud |
| 35 | bottom part of holder unit |
| 36 | receiving hole in base housing |
| 37 | recess for display device |
| 38 | headset holder unit (second embodiment) |
| 39 | display device |
| 40 | incoming call icon |
| 41 | on call icon |
| 42 | record icon |
| 43-45 | antennas |
| 46 | headset connection device |
| 47 | headset user interface |
| 48 | headset processor |
| 49 | headset speaker |
| 50 | headset microphone |
| 51 | headset transceiver |
| 52 | headset multifunction button |
| 53 | headset volume button |
| 54 | earphone housing |
| 55 | arrow |
| 56 | holder unit |
| 57 | arrow |
| 58 | arrow |
| 59 | first headband part |
| 60 | second headband part |
| 61 | headset housing (second embodiment) |
| 62 | swap icon |
| 63, 64 | wired connections |
| 65, 66 | wireless connections |
| 67 | call options icon |
| 68, 69 | first and second call collision icons |
| 70 | speaker volume icon |
| 71 | mute icon |
| 72 | start recording icon |
| 73 | exit icon |
| 74 | scroll down icon |
| 75 | scroll up icon |
| 76 | scroll bar |
| 77 | first adjustment icon |
| 78 | second adjustment icon |
| 79 | speaker volume meter icon |
| 80 | treble icon |
| 81 | normal icon |
| 82 | bass icon |
| 83 | setup wizard icon |
| 84 | reset configuration icon |
| 85 | desk phone icon |
| 86 | connect to a desk phone icon |
| 87 | yes icon |
| 88 | no icon |
| 89 | question icon |
| 90 | instruction icon |
| 91 | microphone level icon |
| 92 | back icon |
| 93 | next icon |
| 94 | headset system |

The invention claimed is:

1. A headset system comprising a wireless headset and a headset base unit, wherein
the wireless headset comprises
a headset transceiver or transmitter-receiver for wireless connectivity to the headset base unit,
a speaker,
a microphone and
a headset user interface, and wherein
the headset base unit comprises
a base housing,
a headset holder,
a first connection device, by means of which the headset base unit is connectable to at least one telecommunication device, such as a desk phone, a PC phone and a mobile phone,
a first base transceiver or transmitter-receiver for wireless connectivity to the wireless headset, and
a base user interface,
at least one audio characteristic, selected from microphone audio volume, microphone audio equalization, speaker audio volume or speaker audio equalization, can be adjusted equally by the headset user interface and the base user interface.

2. A headset system according to claim 1, wherein the headset base unit comprises a display unit with a display adapted for displaying status about audio characteristics.

3. A headset system according to claim 2, wherein the display is a touch-screen display, which acts as base user interface.

4. A headset system according to claim 1, wherein the adjustment of the audio characteristic takes place in the headset.

5. A headset system according to claim 1, wherein the adjustment of the audio characteristic takes place in the headset base unit.

6. A headset system according to claim 1, wherein the headset user interface comprises a headset touch button, wherein at least one audio characteristic can be adjusted by touching the headset touch button.

7. A headset system according to claim 6, wherein the audio characteristic is adjusted by sliding the finger along the headset touch button.

8. A headset system according to claim 7, wherein headset touch button consists of an array of discrete segments, and wherein the audio characteristic is adjusted stepwise by sliding the finger along the headset touch button.

9. A headset system according to claim 6, wherein the audio characteristic is adjusted in dependency on the time the user is touching the headset touch button.

10. A headset system according to claim 9, wherein the headset touch button comprises a first segment and a second segment, wherein the audio characteristic is adjusted in a first direction by touching the first segment and in a second direction by touching the second segment.

11. A headset system according to claim 1, wherein the headset base unit is adapted to instruct a connected telecommunication device to initiate an outgoing call by means of the base user interface.

12. A headset system according to claim 2, wherein the headset base unit is adapted to store a call list or phone book and show this call list or phone book on the display.

13. A headset system according to claim 3, wherein the touch-screen display is adapted to display a keypad for dialing a telephone number.

14. A headset system according to claim 1, wherein the headset speaker provides audible sounds, when the user operates the headset user interface or the base user interface.

15. A headset system according to claim 1, wherein the headset base unit comprises a speaker providing audible sounds, when the user operates the base user interface or the headset user interface.

16. A headset system according to claim 14, wherein the audible sounds comprise voice tags pronouncing words identifying the operation carried out.

17. A headset system according to claim 1, wherein the headset base unit is simultaneously connectable to more than one telecommunication device.

18. A headset system according to claim 17, wherein the headset base unit comprises control means, by means of which an audio channel can be opened between the headset and a selected one of the telecommunication devices.

19. A headset system according to claim 2, wherein the display is adapted to display device icons representing connected telecommunication devices.

20. A headset system according to claim 3, wherein a telecommunication device can be selected by touching the device icon representing the telecommunication device.

21. A headset system according to claim 19, wherein the device icons change appearance in dependence on the call status, such as incoming call, on call and on hold, of the represented telecommunication device.

22. A headset system according to claim 1, wherein the headset is wireless and the headset holder comprises charging terminals for charging a rechargeable battery of the headset, when the headset received by the holder.

23. A headset system according to claim 2, wherein the display is able to show battery status of the headset.

\* \* \* \* \*